(12) United States Patent
Yamashita et al.

(10) Patent No.: US 8,110,611 B2
(45) Date of Patent: *Feb. 7, 2012

(54) COMPOSITION FOR IMAGE RECORDING, IMAGE RECORDING INK SET, AND RECORDING APPARATUS

(75) Inventors: Yoshiro Yamashita, Kanagawa (JP); Ken Hashimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 390 days.

This patent is subject to a terminal disclaimer.

(21) Appl. No.: 12/040,967

(22) Filed: Mar. 3, 2008

(65) Prior Publication Data

US 2009/0076219 A1    Mar. 19, 2009

(30) Foreign Application Priority Data

Sep. 18, 2007   (JP) ................................. 2007-240835

(51) Int. Cl.
*C08F 2/46* (2006.01)
*C08J 3/28* (2006.01)
*C09D 11/08* (2006.01)
*C09D 11/00* (2006.01)

(52) U.S. Cl. .................. 522/80; 522/1; 522/74; 522/71; 522/909; 522/100; 522/90; 106/31.13; 106/31.6; 347/45; 347/2; 347/47; 347/67; 347/71; 347/100; 347/103; 347/102; 428/195.1

(58) Field of Classification Search ................ 522/1, 71, 522/74, 80, 909; 106/31.13, 31.6; 347/2, 347/45, 47, 68, 71, 100, 103, 102; 428/195.1
See application file for complete search history.

(56) References Cited

U.S. PATENT DOCUMENTS

| | | | |
|---|---|---|---|
| 6,228,813 B1 * | 5/2001 | Yabe et al. | 508/106 |
| 6,460,957 B1 | 10/2002 | Quintens et al. | |
| 6,623,816 B1 * | 9/2003 | Tanikawa et al. | 428/32.12 |
| 6,837,578 B2 * | 1/2005 | Tanikawa et al. | 347/103 |
| 7,070,269 B2 * | 7/2006 | Tanikawa et al. | 347/103 |
| 2004/0036754 A1 | 2/2004 | Tanikawa et al. | |
| 2005/0270351 A1 | 12/2005 | Mouri et al. | |
| 2006/0159850 A1 | 7/2006 | Breton et al. | |
| 2007/0165088 A1 | 7/2007 | Maeno et al. | |
| 2007/0195133 A1 | 8/2007 | Igarashi et al. | |
| 2007/0211128 A1 | 9/2007 | Parker et al. | |
| 2009/0079807 A1 * | 3/2009 | Yamashita et al. | 347/102 |

FOREIGN PATENT DOCUMENTS

| | | |
|---|---|---|
| CN | 1847327 | 10/2006 |
| JP | 11-188858 | 7/1999 |
| JP | 2000-94654 | 4/2000 |
| JP | 2000-158794 | 6/2000 |
| JP | 2000-198185 | 7/2000 |
| JP | 2000-343808 | 12/2000 |
| JP | 2001-10114 | 1/2001 |
| JP | 2001-212956 | 8/2001 |
| JP | 2001-315426 | 11/2001 |
| JP | 2002-187240 | 7/2002 |
| JP | 2002-283555 | 10/2002 |
| JP | 2002-321443 | 11/2002 |
| JP | 2002-370347 | 12/2002 |
| JP | 2003-57967 | 2/2003 |
| JP | 2003-080746 | 3/2003 |
| JP | 2003-084578 | 3/2003 |
| JP | 2005-170036 | 6/2005 |
| JP | 2007-076045 | 3/2007 |
| JP | 2007-230232 | 9/2007 |

OTHER PUBLICATIONS

USPTO Office Action, U.S. Appl. No. 12/051,934, Jul. 27, 2010.

* cited by examiner

*Primary Examiner* — Sanza McClendon
(74) *Attorney, Agent, or Firm* — Fildes & Outland, P.C.

(57) ABSTRACT

A composition for image recording includes a curable material that is curable by an external stimulus, and an oil absorbing material.

17 Claims, 4 Drawing Sheets

COMPOSITION FOR IMAGE RECORDING, IMAGE RECORDING INK SET, AND RECORDING APPARATUS

CROSS-REFERENCE TO RELATED APPLICATIONS

This application is based on and claims priority under 35 USC 119 from Japanese Patent Application No. 2007-240835 filed Sep. 18, 2007.

BACKGROUND

1. Technical Field

The present invention relates to a composition for image recording, an image recording ink set, and a recording apparatus.

2. Related Art

One of the methods of recording images, data, etc. using ink is the inkjet recording method. The principle of the inkjet recording method is that liquid or melted solid ink is ejected from a nozzle, a slit, or a porous film, etc. to thereby perform recording on paper, cloth, film, etc. Various methods of ejecting ink have been proposed such as a so-called charge controlling method, in which ink is ejected using an electrostatic attraction force, a so-called drop-on-demand method (a pressure pulse method), in which ink is ejected using vibration pressure of a piezo element, and a so-called thermal inkjet method, in which ink is ejected using pressure generated by forming and growing air bubbles with high heat. By these methods, recorded materials of extremely high resolution images and data may be obtained.

In the recording methods using ink, including this inkjet recording method, in order to perform recording with high image quality on various recording media such as a permeable medium and an impermeable medium, a method of transferring to the recording medium after recording on an intermediate transfer body has been proposed.

SUMMARY

According to an aspect of the invention, there is provided a composition for image recording, including a curable material that is curable by an external stimulus, and an oil absorbing material.

BRIEF DESCRIPTION OF THE DRAWINGS

Exemplary embodiments of the present invention will be described in detail-based on the following figures, wherein.

DETAILED DESCRIPTION

Exemplary embodiments of the invention are explained below while referring to the figures. The same letterings are given to the members having substantially the same function throughout all figures, and repeated explanations may be omitted.

First Exemplary Embodiment

Figure 1:
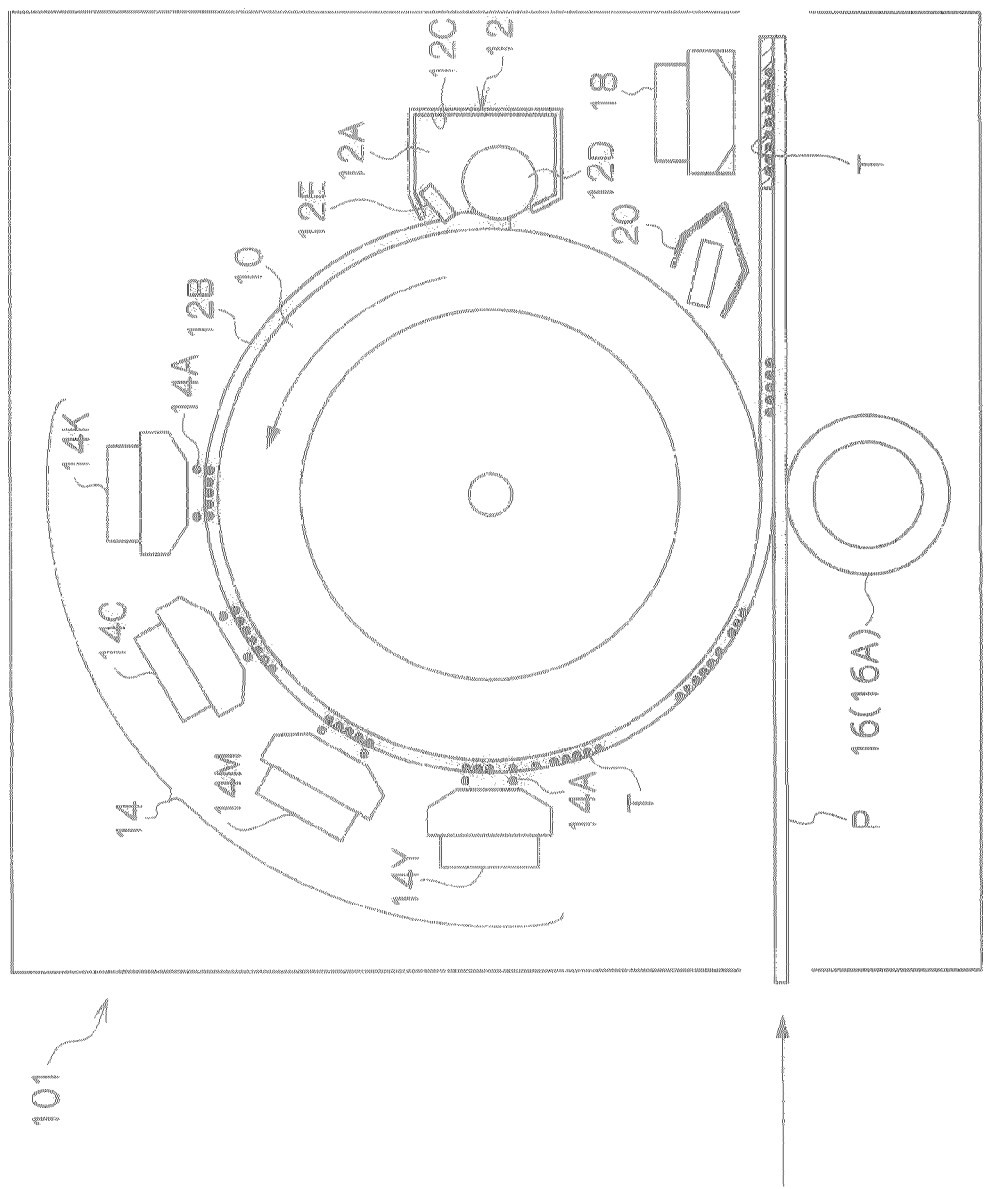
FIG. 1 is a configuration drawing showing a recording apparatus in the first exemplary embodiment.

FIG. 1 is a configuration figure showing a recording apparatus in the first exemplary embodiment.

A recording apparatus 101 in the first exemplary embodiment, as shown in FIG. 1, is configured by including an intermediate transfer drum 10, a solution supply device 12 that supplies a curable solution 12A including a curable material capable of being cured by an external stimulus (energy) and an oil absorbing material onto the intermediate transfer drum 10 to form a layer to be cured 12B that is formed of the curable solution 12A, an inkjet recording head 14 that forms an image T by ejecting oily ink droplets 14A including an oily solvent onto the layer to be cured 12B, a transfer device 16 that transfers the layer to be cured 12B where the image T is formed onto a recording medium P by laying the recording medium P on the intermediate transfer drum 10 and adding pressure, and a stimulus supply device 18 that supplies a stimulus to cure the layer to be cured 12B that has been transferred onto the recording medium P.

A cleaning device 20 to remove residue of the layer to be cured 12B remaining on the surface of the intermediate transfer drum 10 and to remove adhered substances such as foreign substances (paper dust of the recording medium P, etc.) besides the residue is arranged on the downstream side of the transfer device 16 in the rotational direction of the intermediate transfer drum 10.

Examples of the configuration of the intermediate transfer drum 10 include a configuration having a cylindrical substrate and a surface layer applied on the surface of the substrate. The intermediate transfer drum 10 has a width (length in the axial direction) that is equal to or larger than the width of the recording medium P.

Examples of the material of the cylindrical substrate include aluminum, stainless steel (SUS), and copper.

Examples of the surface layer include various resins [for example, polyimide, polyamide imide, polyester, polyurethane, polyamide, polyether sulfone, fluorine-based resins, etc], and various rubbers (for example, nitrile rubber, ethylene-propylene rubber, chloroprene rubber, isoprene rubber, styrene rubber, butadiene rubber, butyl rubber, chlorosulfonated polyethylene, urethane rubber, epichlorohydrin rubber, acrylic rubber, silicone rubber, fluorine rubber, etc.). The surface layer may be a single layered configuration or may be a multi-layered configuration.

The solution supply device 12 is configured, for example, by including a supply roller 12D that supplies the curable solution 12A to the intermediate transfer drum 10 and a blade 12E that defines the thickness of the layer to be cured 12B that is formed of the supplied curable solution 12A in a casing 12C storing the curable solution 12A.

The solution supply device 12 may have a configuration in which the supply roller 12D continuously makes contact with the intermediate transfer drum 10 or is separated from the intermediate transfer drum 10. In the solution supply device 12, the curable solution 12A may be supplied to the casing 12C from an independent solution supply system (not shown in the Figures), so that the supply of the curable solution 12A is not interrupted.

The "curable material capable of being cured by an external stimulus (energy)" included in the curable solution 12A means a material that is cured by an external stimulus to become a "cured resin". Examples thereof include curable monomers, curable macromers, curable oligomers, and curable prepolymers. The detail is explained later.

The "oil absorbing material" included in the curable solution 12A means a material that absorbs an oily solvent. The detail is explained later.

The solution supply device 12 is not limited to the above-described configuration, and an device using a known supply method may be applied (such as a coating method such as coating with a bar coater, coting with a spraying method, coating with an inkjet method, coating with an air knife method, coating with a blade method, and coating with a roll method).

The inkjet recording head 14 is configured by including a recording head of each color, for example, from the upstream side of the rotational direction of the intermediate transfer drum 10, a recording head 14K to eject black ink, a recording head 14C to eject cyan ink, a recording head 14M to eject magenta ink, and a recording head 14Y to eject yellow ink. The configuration of the recording head 14 is not limited to the above-described configuration, and it may be configured only with the recording head 14K or may be configured only with the recording head 14C, the recording head 14M, and the recording head 14Y.

Each of the recording heads 14 may be a line-type inkjet recording head having a width equal to or larger than the width of the recording medium P. Alternatively, a conventional scan-type inkjet recording head may be used. The method of ejecting ink of each of the recording heads 14 is not limited as long as it is a method capable of ejecting ink, such as a piezoelectric element driving type and a heating element driving type.

Each of the recording heads 14 is arranged in series in the order of the recording head 14K, the recording head 14C, the recording head 14M, and the recording head 14Y from the upstream side of the rotational direction of the intermediate transfer drum 10.

Each of the recording heads 14 is arranged in a way that the distance between the surface of the intermediate transfer drum 10 and the nozzle face of the head is about 0.3 to 0.7 mm for example. Each of the recording heads 14 is arranged in a way that the longitudinal direction crosses (for example, at a right angle) with the rotational direction of the intermediate transfer drum.

The transfer device 16 is configured by including a pressure roll 16A arranged to press against the intermediate transfer drum 10. The pressure roll 16A, for example, may be configured to have the same material configuration as that of the above-described intermediate transfer drum 10.

The stimulus supply device 18 is selected depending on the type of the curable material included in the curable solution 12A to be applied. Specifically, for example, in the case of applying an ultraviolet curable material, an ultraviolet ray irradiation device that irradiates ultraviolet rays to the curable solution 12A (the layer to be cured 12B that is formed of the curable solution 12A) is selected as the stimulus supply device 18. In the case of applying an electron beam curable material, an electron beam irradiation device that irradiates electron beams to the curable solution 12A (the layer to be cured 12B that is formed of the curable solution 12A) is selected as the stimulus supply device 18. In the case of applying the thermosetting material, a heat applying device that applies heat to the curable solution 12A (the layer to be cured 12B that is formed of the curable solution 12A) is selected as the stimulus supply device 18.

Examples of the ultraviolet ray irradiation device include a metal halide lamp, a high-pressure mercury lamp, an extra-high pressure mercury lamp, a deep ultraviolet ray lamp, a lamp in which a mercury lamp is excited from outside using a microwave without electrodes, an ultraviolet laser, a xenon lamp, and a UV-LED.

The irradiation condition of the ultraviolet rays is not specifically limited as long as it is a condition capable of sufficiently curing the curable solution 12A containing the ultraviolet curable material (the layer to be cured 12B that is formed of the curable solution 12A), and may be selected depending on the type of the ultraviolet curable material, the thickness of the layer to be cured 12B, etc. Examples of the condition include the condition that an irradiation is for 2 seconds with a high-pressure mercury lamp of 120 W/cm power density.

Examples of the electron beam irradiation device include a scanning type and a curtain type, and the curtain type is a device that draws out thermoelectrons generated on a filament by a grid in a vacuum chamber, rapidly accelerates them with a high voltage (for example, 70 to 300 kV) to make an electron stream, and discharges it to the atmosphere side through a window foil. The wavelength of the electron beams is generally smaller than 1 nm, and the energy of the electron beams may reach into a few MeV. However, electron beams with a wavelength number in the order of pm and an energy of a few 10 to a few 100 keV may be used.

The irradiation condition of the electron beams is not specifically limited as long as it is a condition capable of sufficiently curing the curable solution 12A containing the electron beam curable material (the layer to be cured 12B that is formed of the curable solution 12A), and may be selected depending on the type of the electron beam curable material, the thickness of the layer to be cured 12B, etc. Examples of the condition include the condition that the amount of the electron beams is in 5 to 100 KGy level.

Examples of the heat applying device include a halogen lamp, a ceramic heater, a nichrome-wire heater, a microwave heater, and an infrared ray lamp. A heating device with an electromagnetic induction method may be applied as the heat applying device.

The heat applying condition is not specifically limited as long as it is a condition capable of sufficiently curing the curable solution 12A containing the thermosetting material (the layer to be cured 12B that is formed of the curable solution 12A), and may be selected depending on the type of the thermosetting material, the thickness of the layer to be cured 12B, etc. Example of the condition include the condition that the heating is performed in air at 200° C. for 5 minutes.

The "sufficiently cured state" means the state in which transfer does not occur when a permeable paper (plain paper) is laid on the cured layer obtained by curing the layer to be cured 12B using the stimulus supply device 18 and then a load of 200 g is applied.

Any permeable medium (for example, plain paper, coated paper, etc.) and impermeable medium (for example, art paper, resin film, etc.) may be applied as the recording medium P. The recording medium is not limited to these and may be other industrial products such as a semiconductor substrate.

The image recording process of the recording apparatus 101 in the embodiment is explained below.

In the recording apparatus 101 in the embodiment, the intermediate transfer drum 10 is rotationally driven, and the layer to be cured 12B is formed first by supplying the curable solution 12A to the surface of the intermediate transfer drum 10 by the solution supply device 12.

The thickness of the layer to be cured 12B is not specifically limited, but may be in the range of 1 to 50 μm, 2 to 20 μm, or 3 to 10 μm. In the case that the image density is low (the amount of ink fed is small (for example, 0.1 to 1.5 g/m$^2$)), it may be possible to control the thickness of the layer to be cured 12B to be a minimum necessary thickness (for example, 1 to 5 μm), and in the case that the image density is high (the amount of ink fed is large (for example, 4 to 15 g/m$^2$)), it may be possible to control it to be a thickness of 4 to 10 μm for example.

For example, when the thickness of the layer to be cured 12B is set to a degree that ink droplets 14A do not reach to the lowest portion of the layer to be cured 12B, the portion in which the ink droplets 14A exist in the layer to be cured 12B is not exposed after the transfer to the recording medium P, and the portion in which the ink droplets 14A do not exist functions as a protective layer after curing.

The ink droplets 14A are ejected by the inkjet recording head 14, and the ink droplets 14A are applied to the layer to be cured 12B supplied on the intermediate transfer drum 10. The inkjet recording head 14 applies the ink droplets 14A to a predetermined position of the layer to be cured 12B based on the predetermined image information.

The ejection of the ink droplets 14A by the inkjet recording head 14 is performed on the intermediate transfer drum 10 which is a rigid body. That is, the ejection of the ink droplets 14A is performed on the layer to be cured 12B in a state that the surface of the drum has no flexure.

By interposing the recording medium P between the intermediate transfer drum 10 and the transfer device 16 by the transfer device 16 and adding pressure to the layer to be cured 12B, the layer to be cured 12B on which the image is formed by the ink droplets 14A is transferred onto the recording medium P.

By curing the layer to be cured 12B with the stimulus supply device 18, the image T by the ink droplets 14A is fixed on the recording medium P by the cured resin. Thus, a cured resin layer (image layer) including the image T by the ink droplets 14A is formed on the recording medium P.

The residue of the layer to be cured 12B remained on the surface of the intermediate transfer drum 10 and foreign substances after the layer to be cured 12B was transferred to the recording medium P are removed by the cleaning device 20, the layer to be cured 12B is again formed by supplying the curable solution 12A on the intermediate transfer drum 10 by the solution supply device 12, and the image recording process is repeated.

In the recording apparatus 101 in the embodiment, the image recording is performed as described above.

Second Exemplary Embodiment

Figure 2:
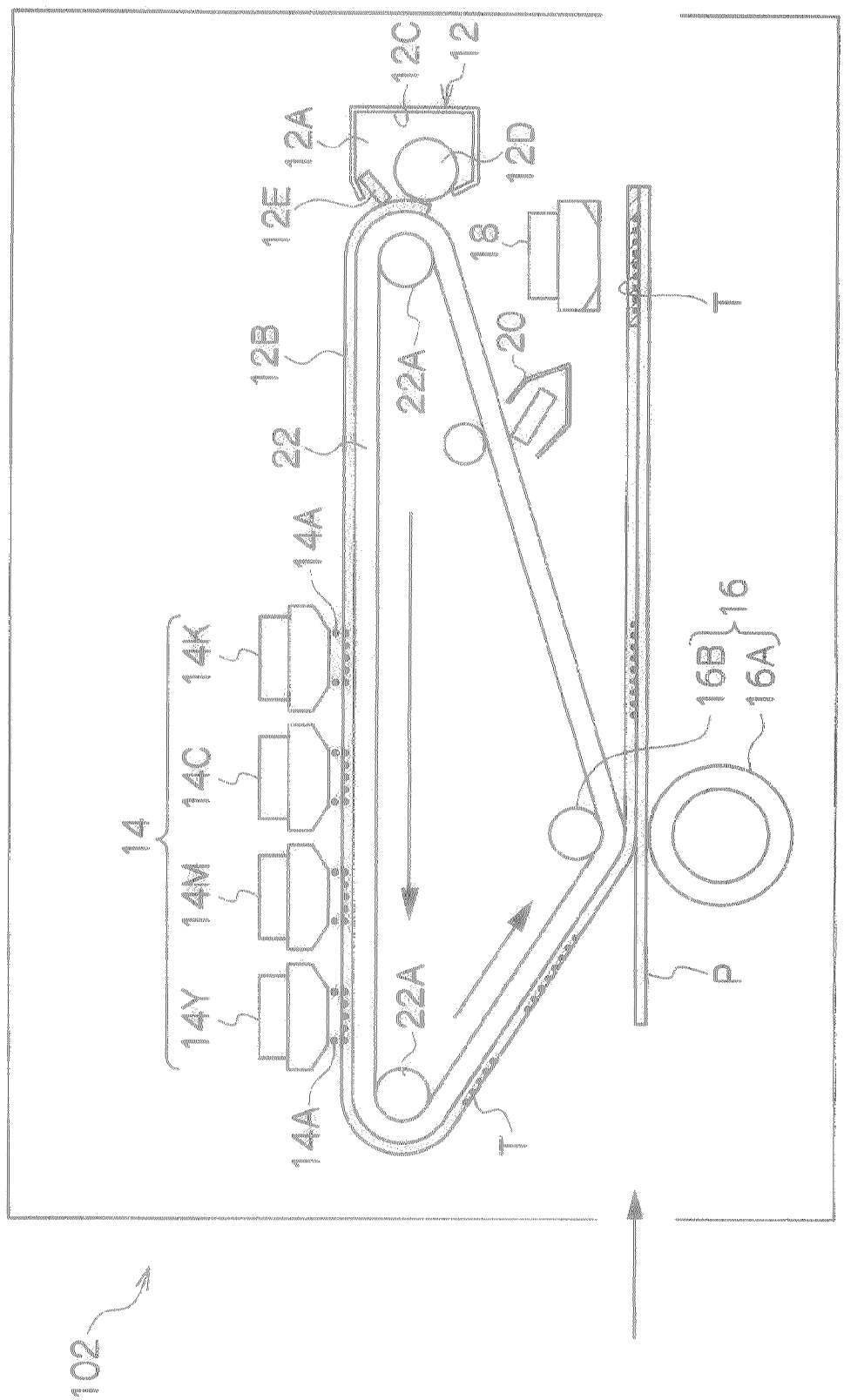
FIG. 2 is a configuration drawing showing a recording apparatus in the second exemplary embodiment.

FIG. 2 is a configuration drawing showing a recording apparatus in the second exemplary embodiment.

A recording apparatus 102 in the second exemplary embodiment is, as shown in FIG. 2, an embodiment in which an intermediate transfer belt 22 is arranged instead of the intermediate transfer drum 10 in the first exemplary embodiment.

The intermediate transfer belt 22 is arranged, for example, so as to be rotatably supported by two supporting rolls 22A and a pressure roll 16B (transfer device 16) in a way that tension is applied from the inner peripheral surface side.

The intermediate transfer belt 22 had a width (length in the axial direction) equal to or more than the width of the recording medium P.

The intermediate transfer belt 22 is configured, for example, with various resins [for example, polyimide, polyamide imide, polyester, polyurethane, polyamide, polyether sulfone, fluorine-based resins, etc.], and various rubbers (for example, nitrile rubber, ethylene-propylene rubber, chloroprene rubber, isoprene rubber, styrene rubber, butadiene rubber, butyl rubber, chlorosulfonated polyethylene, urethane rubber, epichlorohydrin rubber, acrylic rubber, silicone rubber, fluorine rubber, etc.). The intermediate transfer belt 22 may be configured with a metal material such as stainless steel. The intermediate transfer belt 22 may be a single layer configuration or may be a multi-layer configuration. The intermediate transfer belt 22 may have a surface layer of a releasing material such as fluorine-based resins and silicone rubber.

Each of the recording heads 14 is arranged on a non-curved region of the intermediate transfer belt which is rotatably supported and to which tension is applied, so that the distance between the surface of the intermediate transfer belt 22 and the nozzle surface of the head is for example about 0.7 to 1.5 mm.

The transfer device 16 is configured by including a pair of pressure rolls 16A and 16B arranged to face each other and interpose the intermediate transfer belt 22 therebetween.

In the recording apparatus 102 in the embodiment, the ink droplets 14A are ejected by the inkjet recording head 14 to apply the ink droplets 14A onto the layer to be cured 12B formed on the intermediate transfer belt 22.

The ejection of the ink droplets 14A by the inkjet recording head 14 is performed on the non-curved region of the intermediate transfer belt 22 which is rotatably supported and to which tension is applied. That is, the ejection of the ink droplets 14A is preformed on the layer to be cured 12B in a state that the surface of the belt has no flexure.

Except for the above explanation, the second exemplary embodiment is the same as the first exemplary embodiment, and further explanation is omitted.

Third Exemplary Embodiment

Figure 3:
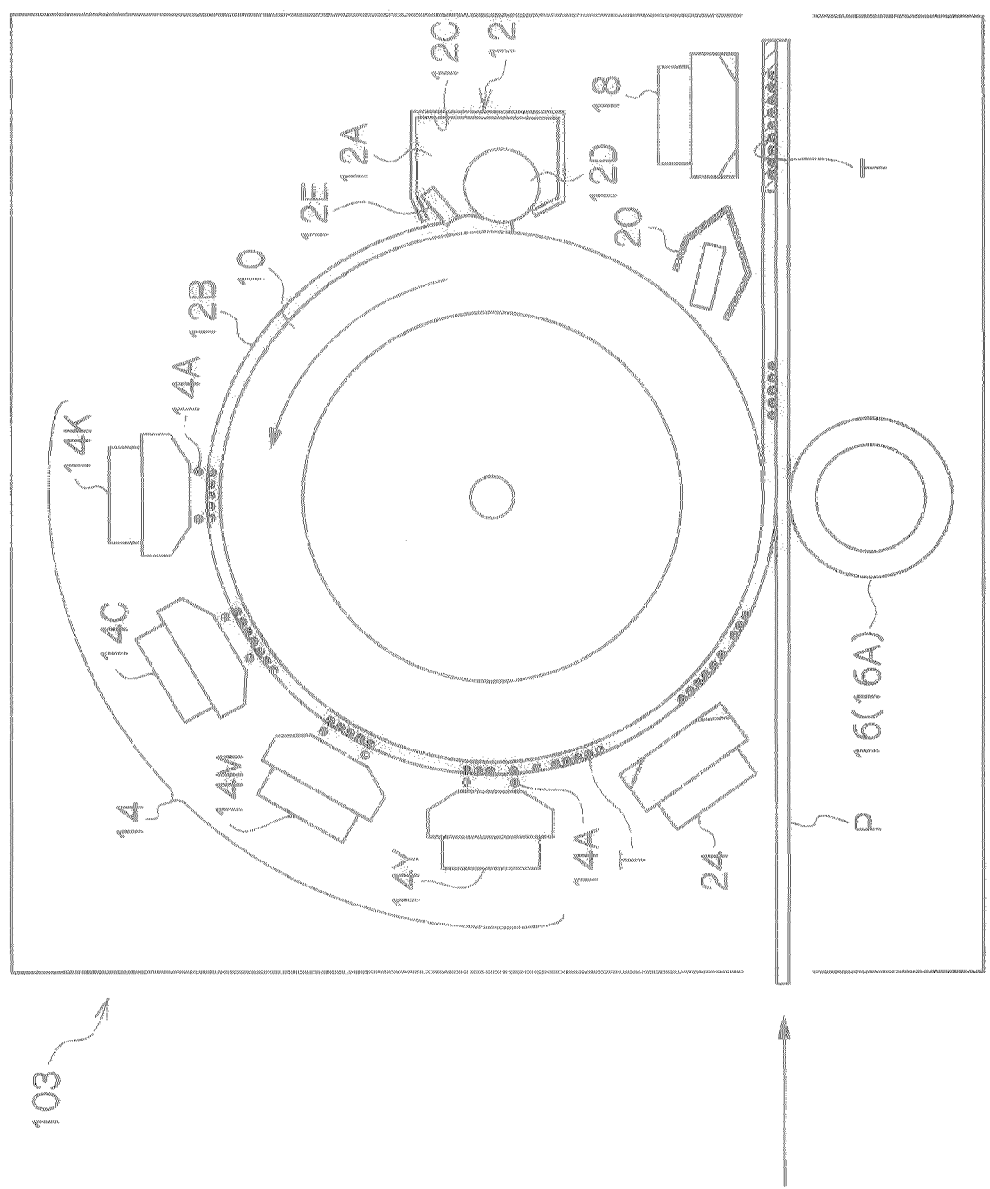
FIG. 3 is a configuration drawing showing a recording apparatus in the third exemplary embodiment.

FIG. 3 is a configuration drawing showing a recording apparatus in the third exemplary embodiment.

A recording apparatus 103 in the third exemplary embodiment, as shown in FIG. 3, is an embodiment in which a second stimulus supply device 24 is further arranged in the first exemplary embodiment to supply a stimulus to partially-cure the layer to be cured 12B before the layer to be cured 12B or which the image by the ink droplets 14A is formed is transferred onto the recording medium P.

The second stimulus supply device 24 is, for example, arranged in the downstream side from the inkjet recording head 14 but in the upstream side from the transfer device 16 in the rotational direction of the intermediate transfer belt 22.

The second stimulus supply device 24 is selected depending on the type of the curable material included in the curable solution 12A to be applied in the same way as the stimulus supply device 18. Specifically, for example, in the case of applying the ultraviolet curable material, an ultraviolet irradiation device that irradiates ultraviolet rays to the curable solution 12A (the layer to be cured 12B that is formed of the curable solution 12A) is applied as the second stimulus supply device 24. In the case of applying the electron beam curable material, an electron beam irradiation device that irradiates electron beams to the curable solution 12A (the layer to be cured 12B that is formed of the curable solution 12A) is applied as the second stimulus supply device 24. In the case of applying the thermosetting material, a heating device that heats the curable solution 12A (the layer to be cured 12B that is formed of the curable solution 12A) is applied as the second stimulus supply device 24.

The ultraviolet ray irradiation condition, the electron beam irradiation condition, and the heating condition in the second stimulus device 24 are not specifically limited as long as they are conditions in which the layer to be cured 12B which is on the intermediate transfer drum 10 and to which ink droplets 14A have been applied by the inkjet recording heads 14 is transferred to the recording medium P in a partially cured state by the transfer device 16, and may be selected depending on the type of the curable material, the thickness of the layer to be cured, etc.

In this exemplary embodiment, although the second stimulus supply device 24 is arranged on the downstream side from the inkjet recording head 14 but on the upstream side from the transfer device 16, the second stimulus supply device 24 may be arranged on the upstream side from the inkjet recording head 14. If the second stimulus supply device 24 is arranged on the upstream side from the inkjet recording head 14, ink droplets 14A are ejected onto the layer to be cured 12B by the inkjet recording heads 14 after the layer to be cured 12B is partially cured and the viscosity of the layer is increased. Accordingly, since diffusion of the ink droplets 14A in the layer to be cured 12B is further prevented, a further high resolution image may be formed.

The "partially cured state" is a state in which the curable material is not yet in the above-mentioned "sufficiently cured state" but is cured more than the state when supplied onto the intermediate transfer body and is not in a complete liquid state. One of the methods of confirming a "partially-cured" state is as follows. When a permeable paper (for example, plain paper) is placed on the layer to be cured 12B, the layer to be cured 12B is not transferred to the paper at all without applying a load but a part of the layer is transferred with applying a load of 200 g. This is a "partially-cured state".

In the recording apparatus 103 in the embodiment explained above, the ink droplets 14A are ejected by the inkjet recording head 14, and after applying the ink droplets 14A to the layer to be cured 12B supplied on the intermediate transfer drum 10, the layer to be cured 12B is partially-cured by the second stimulus supply device 24. Then, the layer to be cured 12B is transferred to the recording medium P by the transfer device 16. At this transfer, the layer to be cured 12B is transferred to the recording medium P in a partially-cured state, that is, a state in which it has some degree of rigidity.

Except for the above explanation, the third exemplary embodiment is the same as the first exemplary embodiment, and further explanation is omitted.

Fourth Exemplary Embodiment

Figure 4:
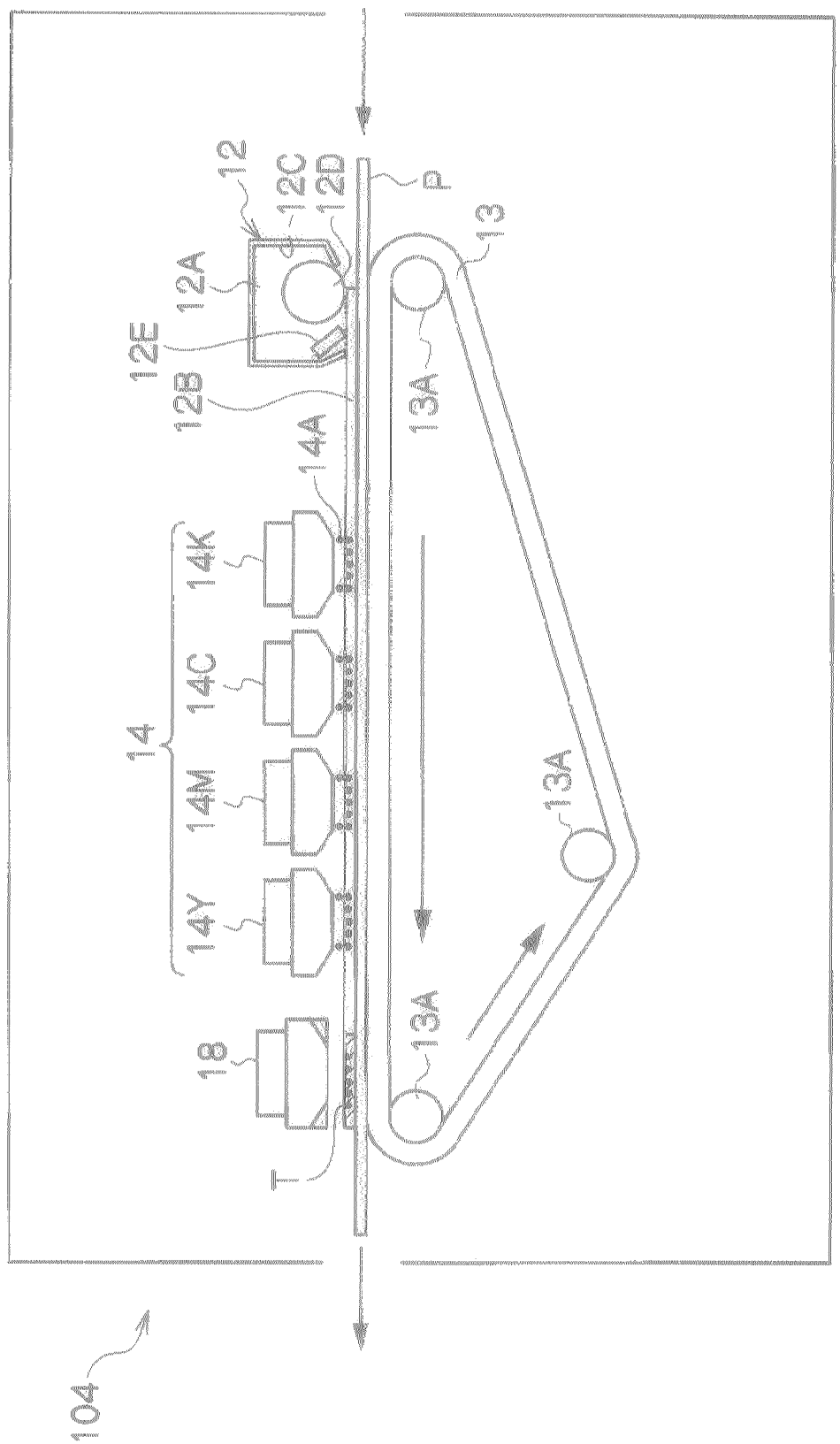
FIG. 4 is a configuration drawing showing a recording apparatus in the fourth exemplary embodiment.

FIG. 4 is a configuration drawing showing a recording apparatus in the fourth exemplary embodiment.

A recording apparatus 104 in the fourth exemplary embodiment is, as shown in FIG. 4, an embodiment in which an image is formed directly on the recording medium P (direct recording system).

The recording apparatus 104 includes, for example, a solution supply device 12 that supplies a curable solution 12A including a curable material that is capable of being cured by an external stimulus (energy) and an oil absorbing material on a recording medium P to form a layer to be cured 12B that is formed of the curable solution 12A, an inkjet recording head 14 that forms an image T by ejecting oily ink droplets 14A including an oily solvent on the layer to be cured 12B, and a stimulus supply device 18 that supplies a stimulus for curing the layer to be cured 12B.

Further, the recording apparatus 104 includes a conveying belt 13 that conveys the recording medium P. As the conveying belt 13, for example, an endless belt may be used, like an intermediate transfer belt 22 in the second exemplary embodiment. The conveying belt 13 is, for example, arranged so that the belt is rotatably supported and tension is applied to the belt from the inner peripheral surface side by three supporting rolls 13A. The conveying belt 13 rotates and moves to convey the recording medium P fed from a container or the like (not shown in Figs.) in the direction of the arrow sign.

In the recording apparatus 104, a solution supply device 12 supplies a curable solution 12A onto the surface of a recording medium P being conveyed by the conveying belt 13 to form a layer to be cured 12B. Then, based on predetermined image information, inkjet recording heads 14 eject ink droplets 14A to apply the ink droplets 14A onto the layer to be cured 12B that has been formed on the recording medium P to form an image T. Finally, a stimulus supply device 18 cures the layer to be cured 12B, whereby a cured resin layer (image layer) including the image T by the ink droplets 14A is formed on the recording medium P.

Except for the above explanation, the fourth exemplary embodiment is the same as the first exemplary embodiment, and further explanation is omitted.

In each of the recording apparatuses of the above-mentioned exemplary embodiments, a curable solution 12A is applied onto an intermediate transfer drum 10, an intermediate transfer belt 22, or a recording medium P to form a layer to be cured 12B. Ink droplets 14A are applied onto the layer to be cured 12B to form an image T (and the layer is transferred to a recording medium P in the first to third exemplary embodiments) followed by completely curing the layer to be cured 12B on which the image T has been formed. At that time, the curable material included in the layer to be cured 12B is cured to be a "cured resin". Accordingly, image formation may be performed on various recording media P including permeable media and impermeable media.

In the first to third exemplary embodiments, since an intermediate transfer system is used, a step of transferring the layer to be cured 12B which is on the intermediate transfer body (the intermediate transfer drum 10 or the inter transfer belt 22) and on which the image T has been formed to the recording medium P. Accordingly, when the thickness of the layer to be cured 12B is set to a degree that ink droplets 14A do not reach to the lowest portion of the layer to be cured 12B, the portion in which the ink droplets 14A exist in the layer to be cured 12B (image T portion) is not exposed after the transfer to the recording medium P, and the portion in which the ink droplets 14A do not exist functions as a protective layer after curing, so that the image storability may be improved.

In the fourth exemplary embodiment, since a system (direct recording system) in which a curable solution 12A is directly supplied to a recording medium P is used, the configuration is simple and an image may be formed at high speed and low cost.

In each of the recording apparatuses of the above-mentioned exemplary embodiments, since the curable solution 12A includes an oil absorbing material, the oily solvent included in the oily ink droplets 14A is absorbed in the oil absorbing material. Accordingly, since diffusion of the ink droplets 14A in the layer to be cured 12B is prevented, the ink droplets 14A are fixed in the layer to be cured 12B, so that a high resolution image may be formed.

Hereinafter, the curable material used in the invention will be explained.

Examples of the curable material include an ultraviolet curable material, an electron beam curable material, and a thermosetting material. The ultraviolet curable material is easily cured, the curing speed is faster than the other materials, and the handling is easy. The electron beam curable material does not require a polymerization initiator, and control of coloration of the layer after curing is easily performed. The thermosetting material is cured without any large device required. The curable material is not limited to these, and curable material which is cured by for example moisture, oxygen, or the like may be applied.

Examples of the "ultraviolet cured resin" obtained by curing the ultraviolet curable material include an acrylic resin, a methacrylic resin, a urethane resin, a polyester resin, a maleimide resin, an epoxy resin, an oxetane resin, a polyether resin, and a polyvinylether resin. The curable solution 12A includes at least one of an ultraviolet curable monomer, an ultraviolet curable macromer, an ultraviolet curable oligomer, and an ultraviolet curable prepolymer. The curable solution 12A may include an ultraviolet polymerization initiator to make the ultraviolet curing reaction proceed. Further, the curable solution 12A may optionally include a reaction auxiliary agent, or a polymerization promoter, which promotes the polymerization reaction.

Examples of the ultraviolet curable monomer include radical curable materials such as an acrylate of an alcohol, a polyalcohol, or aminoalcohol, a methacrylate of an alcohol, or a polyalcohol, an acryl alipyhatic amide, an acryl alicycle amide, and an acryl aromatic amide; cationic curable materials such as an epoxy monomer, an oxetane monomer, and a vinyl ether monomer. Examples of the ultraviolet curable macromer, the ultraviolet curable oligomer, and the ultraviolet curable prepolymer include, in addition to those obtained by polymerizing these monomers at a predetermined polymerization degree, radical curable materials such as an epoxy acrylate, urethane acrylate, polyester acrylate, polyether acrylate, urethane methacrylate, or polyester methacrylate in which an acryloyl or a methacrylate group is added to an epoxy, urethane, polyester, or polyether skeleton.

In the case where the curing reaction is a radical curing reaction, examples of the ultraviolet polymerization initiator include benzophenones, thioxanthones, benzyldimethyl ketals, α-hydroxy ketones, α-hydroxyalkyl phenones, α-amino ketones, aminoalkyl phenones, monoacylphosphine oxides, bisacylphosphine oxides, hydroxy benzophenones, amino benzophenones, titanocenes, oxime esters, and oxyphenyl acetates.

In the case where the curing reaction is a cationic curing reaction, examples of the ultraviolet polymerization initiator include aryl sulfonium salts, aryl diazonium salts, diaryl iodonium salts, triaryl sulfonium salts, allene-ion complex derivatives, and triazines.

Examples of the "electron beam cured resin" obtained by curing the electron beam curable material include ar.acrylic resin, a methacrylic resin, a urethane resin, a polyester resin, a polyether resin, and a silicone resin. The curable solution 12A includes at least one of an electron beam curable monomer, an electron beam curable macromer, an electron beam curable oligomer, and an electron beam curable prepolymer.

Examples of the electron beam curable monomer, macromer, oligomer, or prepolymer include the same materials as the ultraviolet curable materials.

Examples of the "thermoset resin" obtained by curing the thermosetting material include an epoxy resin, a polyester resin, a phenol resin, a melamine resin, a urea resin, and an alkyd resin. The curable solution 12A includes at least one of a thermosetting monomer, a thermosetting macromer, a thermosetting oligomer, and a thermosetting prepolymer. A curing agent may be added at polymerization. The curable solution 12A may include a thermal polymerization initiator to make the thermosetting reaction proceed.

Examples of the thermosetting monomer include phenol, formaldehyde, bisphenol A, epichlorohydrin, cyanuric acid amide, urea, and polyalcohols such as glycerin, and acids such as phthalic anhydride, maleic anhydride, and adipic acid. Examples of the thermosetting macromer, oligomer, and prepolymer include those obtained by polymerizing these monomers at a predetermined polymerization degree, an epoxy prepolymer, and a polyester prepolymer.

Examples of the thermal polymerization initiator include acids such as proton acid/Lewis acid, alkaline catalysts, and metal catalysts.

As mentioned above, the curable material may be a material which is cured (for example, through a polymerization reaction) by an external energy such as ultraviolet rays, electron beams, or heat Of the above-mentioned curable materials, in view of high speed image recording, a material which is cured at high curing speed (such as a material of which polymerization reaction speed is high) may be used. Examples of such a material include a radiation curing material (such as the ultraviolet curable material and the electron beam curable material).

In the present exemplary embodiments, as mentioned above, a curable material and an oil absorbing material are included in the curable solution 12A. Accordingly, an embodiment in which an external energy not changing the properties of the oil absorbing material (for example, not decomposing or modifying the material) is applied may be preferable. When considering such a point, ultraviolet rays may be used as the external energy, and an ultraviolet curable material may be used as the curable material.

In considering the wettability to the intermediate transfer body or the like, the curable material may be modified with Si or fluorine. In considering the curing speed and the curing degree, the curable material may include a polyfunctional prepolymer.

The curable material may be a material that is poorly absorbed in the oil absorbing material. For example, when an "oil absorbing material that poorly absorbs a material having polarity" is used as the oil absorbing material, a curable material having polarity may be used as the curable material. Examples of the curable material having polarity include materials having in the molecular structure many polar groups per molecular weight, such as an ester group, a urethane group, an oxyalkylene group, an amide group, an amino group, an ether group, a hydroxyl group, and a carboxylic acid group.

In view of formation of a high resolution image, the shrinkage due to curing reaction of the curable material may be small. In view of prevention of the shrinkage due to curing reaction, the flexibility of the curable material may not be too high. The viscosity of the curable material may be 5 mPa·s or more.

Next, the oil absorbing material will be explained.

The oil absorbing material is a material that absorbs oily solvent. Examples of the oil absorbing material include inorganic materials such as kaolin clay, silica, and lime, low molecular weight gelling agents such as hydroxystearic acid, a cholesterol derivative, and benzylidene sorbitol, resins such as polynorbornene, polystyrene, polypropylene, styrene-butadiene copolymer, and rosins.

The oil absorbing material may have a liquid non-absorbing property with respect to the curable material. When the oil absorbing material has a liquid non-absorbing property with respect to the curable material, decrease of the liquid absorbing property of the oil absorbing material with respect to the oily solvent due to absorption of the curable material in the oil absorbing material may be prevented. Therefore, in this case, a higher resolution image may be formed compared to the case where the oil absorbing material has a liquid absorbing property with respect to the curable material.

The "having a liquid non-absorbing property" means having a liquid absorbing amount of 50 ml/100 g or less. The "liquid absorbing amount" means the amount (ml) of the liquid absorbed in 100 g of the oil absorbing material and is measure as follows.

Specifically, a sample of the oil absorbing material is put on an oil layer until the sample is saturated with the oil, and then the sample is taken out and put on a mesh for 5 minutes, and the weight of the sample is then measured. The difference from the initial weight is the absorbing amount. Alternatively, the method according to JIS K5101-13-1 may be used.

The liquid absorbing amount of the oil absorbing material with respect to the curable material may be, for example, 100 ml/100 g or less, 50 ml/100 g or less, or 30 ml/100 g or less.

The oil absorbing material may have a liquid absorbing property with respect to the oily solvent. When the oil absorbing material has a liquid absorbing property with respect to the oily solvent, since the above-mentioned effect due to the absorption of the oily solvent in the oil absorbing material may be larger, a higher resolution image may be formed.

The "having a liquid absorbing property" means having a liquid absorbing amount of 100 ml/100 g or more.

The liquid absorbing amount of the oil absorbing material with respect to the oily solvent may be, for example, 70 ml/100 g or more, 100 ml/100 g or more, or 200/ml100 g or more.

The absorbing amount of the oil absorbing material with respect to the curable material may be smaller than that of the oil absorbing material with respect to the oily solvent. When the absorbing amount of the oil absorbing material with respect to the curable material is smaller than that of the oil absorbing material with respect to the oily solvent, the oily solvent is selectively absorbed in the oil absorbing material. Accordingly, decrease of the liquid absorbing property of the oil absorbing material with respect to the oily solvent due to absorption of the curable material in the oil absorbing material may be prevented, and the above-mentioned effect due to the absorption of the oily solvent in the oil absorbing material may be large, so that a higher resolution image may be formed.

When the absorbing amount of the oil-absorbing material with respect to the curable material is Ar (ml/100 g), and the absorbing amount of the oil-absorbing material with respect to the oily solvent is As (ml/100 g), Ar/As may be 0 to 0.5, 0 to 0.3, or 0 to 0.1.

Examples of the embodiment in which the liquid absorbing amount of the oil absorbing material with respect to the curable material is smaller than that of the oil absorbing material with respect to the oily solvent include an embodiment in which an oil absorbing material that poorly absorbs a material having polarity but well absorbs a non-polar solvent, a curable material having polarity, and an oily ink in which the oily solvent is a non-polar solvent are used in combination.

In the above embodiment, since the oil absorbing material poorly absorbs a material having polarity, the curable material having polarity is poorly absorbed in the oil absorbing material, and decrease of the liquid absorbing property of the oil absorbing material with respect to the oily solvent due to the absorption of the curable material in the oil absorbing material may hardly be occurred. Further, since the oil absorbing material well absorbs a non-polar solvent, the oily solvent (non-polar solvent) is well absorbed in the oil absorbing material. That is, in the above embodiment, the oily solvent is selectively absorbed in the oil absorbing material. Accordingly, since the above-mentioned effect due to the absorption of the oily solvent in the oil absorbing material is large, a higher resolution image may be formed.

Examples of the "oil absorbing material that poorly absorbs a material having polarity but well absorbs a non-polar solvent" include polynorbornene, styrene-butadiene copolymer, and rosins (such as an abietic acid and the salt thereof, a pimaric acid and the salt thereof, an abietylamine and the inorganic or organic acid salt thereof, a pimarylamine and the inorganic or organic acid salt thereof, and rosin amide derivatives).

These oil absorbing material well absorb non-polar solvents such as hexane, toluene, and xylene, mineral oils such as gasoline, and animal or vegetable oils, but poorly absorb solvents having polarity such as ketones and alcohols. Accordingly, when using these oil absorbing materials, a curable material having polarity, and oily ink in which the oily solvent is a non-polar solvent, a higher resolution image may be formed.

The "curable material having polarity" is as mentioned above, and the "oily ink in which the oily solvent is a non-polar solvent" is as mentioned below.

Examples of the embodiment in which the absorbing amount of the oil absorbing material with respect to the curable material is smaller than the absorbing amount of the oil absorbing material with respect to the oily solvent include, in addition to the above embodiment, an embodiment in which an oil absorbing material that poorly absorbs a non-polar material but well absorbs a polar solvent, a non-polar curable material, and an oily ink in which the oily solvent is a polar solvent are used in combination.

Further, the combination of the curable material and the oily solvent is not limited to the combination of "a curable material having polarity and a non-polar solvent" and "a non-polar curable material and a polar solvent" but may be a combination of "high-polarity curable material and a low-polarity solvent" or "a low-polarity curable material and a high-polarity solvent".

The oil absorbing material may be a porous material in order to enlarge the surface area to increase the liquid absorbing property. Also, the oil absorbing material may have a hollow structure in order to enlarge the storage volume of the compound absorbed to increase the liquid absorbing property.

The oil absorbing material may be dissolved in the curable material or may be dispersed in the curable material. In view of the liquid non-absorbing property of the oil absorbing material with respect to the curable material, the oil absorbing material may be self-dispersed or dispersed with a dispersing agent in the curable material.

Examples of the above dispersing agent include the same dispersing agent as the pigment dispersing agent mentioned later.

The volume average particle diameter of the oil absorbing material may be 0.05 μm to 20 μm, 0.1 μm to 15 μm, or 0.2 μm to 10 μm, in view of formation of a high resolution image.

Further, the curable solution 12A may include, in addition to the curable material and the oil absorbing material, other components for fixing the components of the ink on or in the layer to be cured 12B (which may be hereinafter referred to as "other fixation components").

In the present exemplary embodiments, the curable solution 12A includes an oil absorbing material and other fixation components. However, a solution including an oil absorbing material and other fixation components may be separately prepared and ejected onto the layer to be cured 12B by an ejection unit that ejects the solution so as to add the oil absorbing material and other fixation components into the layer to be cured 12B. The step of ejecting the solution including an oil absorbing material and other fixation components onto the layer to be cured 12B may be performed before the step of ejecting the ink droplets 14A onto the layer to be cured 12B by the inkjet recording head 14.

Examples of other fixation components include a component that absorbs components of an ink (such as colorants) and a component that aggregates or thickens components of an ink (such as colorants), but are not limited thereto.

Examples of the component that absorbs the ink components (for example, colorants) include silica, alumina, and zeolite. The ratio of the component is about in the range of 0 to 30% by weight.

Examples of the component that aggregates or thickens the ink component (for example, colorants) include aggregate agents such as an inorganic electrolyte, organic acid and the salts thereof, inorganic acid, organic amine, etc.

Examples of the inorganic electrolyte include salts of an alkali metal ion such as a lithium ion, a sodium ion, a potassium ion, or a polyvalent metal ion such as an aluminum ion, a barium ion, a calcium ion, a copper ion, an iron ion, a magnesium ion, a manganese ion, a nickel ion, a tin ion, a titanium ion and a zinc ion, and acid such as hydrochloric acid, hydrobromic acid, hydriodic acid, sulfuric acid, nitric acid, phosphoric acid, thiocyanic acid.

Specific examples include an alkali metal salt such as lithium chloride, sodium chloride, potassium chloride, sodium bromide, potassium bromide, sodium iodide, potassium iodide, sodium sulfate, potassium nitrate, and a polyvalent metal salt such as aluminim chloride, aluminum bromide, aluminum sulfate, aluminim nitrate, aluminum sodium sulfate, aluminum potassium sulfate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium benzoate, copper chloride, copper bromide, copper sulfate, copper nitrate, iron chloride, iron bromide, iron iodide, iron sulfate, iron nitride, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogenphosphate, nickel chloride, nickel bromide, nickel sulfate, nickel nitrate, tin sulfate, titanium chloride, zinc chloride, zinc bromide, zinc sulfate, zinc nitrate, and zinc thiocyanate.

Examples of the organic acids and the salts thereof include arginine acid, citric acid, glycine, glutamic acid, succinic acid, tartaric acid, cysteine, oxalic acid, fumaric acid, phthalic acid, maleic acid, malonic acid, lycine, malic acid, acetic acid, oxalic acid, lactic acid, fumaric acid, salycilic acid, and benzoic acid, and sodium acetate, potassium oxalate, sodium citrate, and potassium benzoate aluminim acetate, calcium benzoate, calcium acetate, calcium salicylate, calcium tartarate, calcium lactate, calcium fumarate, calcium citrate, copper acetate, iron oxalate, iron lactate, iron fumarate, iron citrate, magnesium acetate, magnesium lactate, manganese acetate, manganese salicylate, manganese benzoate, manganese lactate, nickel acetate, zinc acetate, the comounds represented by Formula (1), and the derivatives of the compounds.

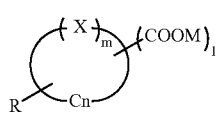

Formula (1)

In the Formula (1), X represents O, CO, NH, $NR_1$, S or $SO_2$. $R_1$ represents an alkyl group and $R_1$ may be $CH_3$, $C_2H_5$ or $C_2H_4OH$. X may be CO, NH, $NR_1$ or O, and more particularly CO, NH or O.

R represents an alkyl group and R may be $CH_3$, $C_2H_5$ or $C_2H_4OH$. R may be or may not be included in the Formula.

M represents a hydrogen atom, an alkali metal or amines. M may be H, Li, Na, K, monoethanol amine, diethanol amine or triethanol amine, more particularly H, Na, or K, and further particularly a hydrogen atom. n represents an integer of 3 to 7, particularly an integer to form a heterocyclic ring having six-membered ring or five-membered ring, and more particularly an integer to form a heterocyclic ring having five-membered ring. m represents 1 or 2. A compound represented by the Formula (1) is a saturated ring or an unsaturated ring as long as the compound is the heterocyclic ring. l represents an integer of 1 to 5.

Specific examples of the compound represented by the Formula (1) include the compound having furan, pyrrole, pyrroline, pyrrolidone, pyrone, pyrrole, thiophene, indole, pyridine, or quinoline structure, and further having a carboxyl group as a functional group. Specific examples of the compound include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolide-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethyl pyrrole-4-carboxylic acid, 2,4,5-trimethyl pyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxyproline, 1-methylpyrrolidine-2-carboxylic acid, 5-carboxy-1-methyl pyrrolidine-2-acetic acid, 2-pyridine carboxylic acid, 3-pyridine carboxylic acid, 4-pyridine carboxylic acid, pyridine dicarboxylic acid, pyridine tricarbodylic acid, pyridine pentacarboxylic acid, 1,2,5,6-tetrahydro-1-methyl nicotinic acid, 2-quinoline carbodylic acid, 4-quinoline carboxylic acid, 2-phenyl-4-quinoline carbodylic acid, 4-hydroxy-2-quinoline carboxylic acid, and 6-methoxy-4-quinoline carbodylic acid.

Specific examples of the organic acid include citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or the derivatives or salts of the compounds. More specific examples of the organic acid include pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or the derivatives or salts of the compounds. Further specific examples of the organic acid include pyrrolidone carboxylic acid, pyrone carboxylic acid, furan carboxylic acid, coumaric acid, or the derivatives or salts of the compounds.

An organic amine compound may be any of a primary amine, secondary amine, tertiary amine, quaternary amine and the salts thereof. Specific examples include a tetraalkyl ammonium, alkylamine, benzalkonium, alkylpyridinium, imidazolium, polyamine and their derivatives or salts. Specific examples include allyl amine, butyl amine, propanol amine, propyl amine, ethanol amine, ethyl ethanol amine, 2-ethyl hexyl amine, ethyl methyl amine, ethyl benzyl amine, ethylene diamine, octyl amine, oleyl amine, cyclooctyl amine, cyclobutyl amine, cyclopropyl amine, cyclohexyl amine, diisopropanol amine, diethanol amine, diethyl amine, di-2-ethylhexyl amine, diethylene triamine, diphenyl amine, dibutyl amine, dipropyl amine, dihexyl amine, dipentyl amine, 3-(dimethyl amino) propyl amine, dimethyl ethyl amine, dimethyl ethylene diamine, dimethyl octyl amine, 1,3-dimethyl butyl amine, dimethyl-1,3-propane diamine, dimethyl hexyl amine, amino butanol, amino propanol, amino propane diol, N-acetyl amino ethanol, 2-(2-amino ethyl amino)-ethanol, 2-amino-2-ethyl-1,3-propane diol, 2-(2-amino ethoxy) ethanol, 2-(3,4-dimethoxy phenyl) ethyl amine, cetyl amine, triisopropanol amine, triisopentyl amine, triethanol amine, trioctyl amine, trityl amine, bis(2-aminoethyl) 1,3-propane diamine, bis (3-aminopropyl) ethylene diamine, bis (3-aminopropyl) 1,3-propane diamine, bis (3-amino propyl) methyl amine, bis (2-ethyl hexyl) amine, bis (trimethyl silyl) amine, butyl amine, butyl isopropyl amine, propane diamine, propyl diamine, hexyl amine, pentyl amine, 2-methyl-cyclohexyl amine, methyl-propyl amine, methyl benzyl amine, monoethanol amine, lauryl amine, nonyl amine, trimethyl amine, triethyl amine, dimethyl propyl amine, propylene diamine, hexamethylene diamine, tetraethylene pentamine, diethyl ethanol amine, tetramethyl ammonium chloride, tetraethyl ammonium bromide, dihydroxy ethyl stearyl amine, 2-heptadecenyl-hydroxyethyl imidazoline, lauryl dimethyl benzyl ammonium chloride, cetylpyridinium chloride, stearamid methyl pyridinium chloride, a diaryl dimethyl ammonium chloride polymer, a diallyl amine polymer, and a monoallyl amine polymer.

More particularly, there are used triethanol amine, triisopropanol amine, 2-amino-2-ethyl-1,3-propanediol, ethanol amine, propane diamine, and propyl amine.

Among these aggregating agents, polyvalent metal salts $(Ca(NO_3), Mg(NO_3), Al(OH_3))$, a polyaluminum chloride, or the like) may be particularly used.

The aggregating agents may either be used alone or as a mixture of two or more kinds. Moreover, the content of the aggregating agent may be 0.01% by weight or more but 30% by weight or less.

The curable solution 12A may include water or an organic solvent to dissolve or disperse the primary component that contributes the above-described curing reaction (monomers, macromers, oligomers, and prepolymers, polymerization initiators, etc.). The ratio of the primary component may be, for example, 30% by weight or more, 60% by weight or more, or 90% by weight or more.

The curable solution 12A may include various colorants to control coloration of the layer after curing.

The weight ratio of the curable material and the oil absorbing material included in the curable solution 12A may be 90:10 to 10:90, 80:20 to 30:70, or 72:25 to 50:50, in view of the balance between the liquid absorbing property of the oil absorbing material with respect to the solvent of the oily ink and the curability of the curable material.

The viscosity of the curable solution 12A may be 50 mPa·s to 100000 mPa·s, 80 mPa·s to 50000 mPa·s, or 100 mPa·s to 10000 mPa·s, in view of easy applicability of the curable solution 12A and easy fixability of the ink droplets 14A. The viscosity of the curable solution may be higher than the viscosity of the ink.

The curable solution 12A containing the curable material may have a low volatility or a non-volatility at the room temperature (25° C.). The low volatility means that the boiling point is 200° C. or more under atmospheric pressure. The non-volatility means that the boiling point is 300° C. or more under atmospheric pressure. The explanation below is the same.

The ink to be applied in the above-described embodiments is explained below.

In the present exemplary embodiments, an oily ink containing an oily solvent is used. Accordingly, the oily solvent included in the oily ink droplets 14A is absorbed in the oil absorbing material, and the ink droplets 14A accepted in the layer to be cured 12B are prevented from diffusing in the layer to be cured 12B, whereby the ink droplets 14A are fixed in the layer to be cured 12B, so that a high resolution image is formed.

First, the oily solvent is explained below. Examples of the oily solvent include organic solvents such as aliphatic hydrocarbons, aromatic hydrocarbons, alcohols, ketones, esters, ethers glycols, nitrogen-containing solvents, and vegetable oils Examples of the aliphatic hydrocarbons include n-Hexane, cyclohexane, methylhexane, n-octane, methylheptane, dimethylhexane, nonane, and decane, and paraffin solvents such as n-paraffin solvents, iso-paraffin solvents, and cycloparaffin solvents, such as Isopar.

Examples of the aromatic hydrocarbons include tolunen, ethylbenzene, and xylene.

Examples of the alcohols include methanol, ethanol, propanol, butanol, hexanol, and benzyl alcohol. Exmples of the ketones include acetone, methylethylketone, pentanone, hexanone, heptanone, and cyclohexanone.

Examples of the esters include methyl acetate, ethyl acetate, vinyl acetate, ethyl propionate, and ethyl butyrate.

Examples of the ethers include diethylether, ethylpropylether, and ethylisopropylether.

Examples of the glycols include theylene glycol, diethylene glycol, propanediol, hexanediol, glycerin, and polypropylene glycol. Glycol derivatives such as ethylene glycol methylether, ethylene glycol ethylether, ethylene glycol butylether, diethylene glycol ethylether, and diethylene glycol butylether may be used.

Examples of the vegetable oils include drying oil, semi-drying oil, and nondrying oil. Examples of the drying oil include perilla oil, linseed oil, tung oil, poppy seed oil, walnut oil, safflower oil, and sunflower oil, examples of the semidrying oil include rapeseed oil, and examples of the nondrying oil include palm oil.

Examples of the animal oils include lard, beef fat, fish oil, chicken oil, chrysalis oil, lanolin, horse oil, whale oil, mink oil, shark oil, and propolis.

The above-described solvents may be used alone or two kinds or more may be used in combination.

The oily solvent may be well absorbed in the oil absorbing material. For example, when an oil absorbing material that poorly absorbs a material having polarity is used as mentioned above, a non-polar solvent may be used as the oily solvent. Examples of such a solvent include an aliphatic or aromatic hydrocarbon that is not substituted with a polar group, a long chain fatty acid ester, and a long chain fatty acid amide.

The oily solvent may have low volatility or non-volatility. When the oily solvent has low volatility or non-volatility, ink condition change due to volatilization of the solvent is hardly occurred at the end portion of the head nozzle, so that resistance to head nozzle clogging is superior and the ejection stability is superior. In view of the ejection stability and resistance to clogging, the oily solvent may have low viscosity. Examples of an oily solvent having low viscosity and low volatility include a branched aliphatic hydrocarbon.

Next, a recording material is explained. Examples of the recording material include a colorant. As a colorant, a dye and a pigment may be used. In view of durability, a pigment may be used.

Any organic pigment or inorganic pigment may be used, and examples of a black pigment include carbon black pigments such as furnace black, lamp black, acetylene black, and channel black. Other than black and the three primary color pigments of cyan, magenta, and yellow, specified colors pigments such as red, green, blue, brown, and white, metallic gloss pigments such as gold and silver, extender pigments such as colorless and light colors, plastic pigments, etc. may be used. Pigments synthesized newly for the invention may also be used.

Moreover, particles prepared by fixing a dye or a pigment onto the surface of silica, alumina, polymer beads, or the like as the core, an insoluble lake product of a dye, a colored emulsion, a colored latex, or the like can also be used as a pigment.

Specific examples of the black pigment include Raven 7000, Raven 5750, Raven 5250, Raven 5000 Ultra II, Raven 3500, Raven 2000, Raven 1500, Raven 1250, Raven 1200, Raven 1190 ULTRA II, Raven 1170, Raven 1255, Raven 1080 and Raven 1060 (manufactured by Columbian Carbon Company); Regal 400R, Regal 330R, Regal 660R, Mogul L, Black pearls L, Monarch 700, Monarch 800, Monarch 880, Monarch 900, Monarch 1000, Monarch 1100, Monarch 1300 and Monarch 1400 (manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degussa Co.); and No. 25, No. 33, No. 40, No. 47, No. 52, No. 900, No. 2300, MCF-88, MA 600, MA 7, MA 8 and MA 100 (manufactured by Mitsubishi Chemical Co., Ltd.). However, the pigments are not restricted thereto.

While specific examples of the cyan color pigments include C.I. Pigment Blue-1, -2, -3, -15, -15:1, -15:2, -15:3, -15:4, -16, -22 and -60, the pigments are not restricted thereto.

While specific examples of the magenta color pigments include C.I. Pigment Red-5, -7, -12, -48, -48:1, -57, -112, -123, -146, -168, -177, -184, -202, and C.I. Pigment Violet-19, the pigments are not restricted thereto.

While specific examples of the yellow color pigments include C.I. Pigment Yellow-1, -2, -3, -12, -13, -14, -16, -17, -73, -74, -75, -83, 93, -95, -97, -98, -114, 128, -129, -138, -151, -154 and -180, the pigments are not restricted thereto.

Here, in the case a pigment is used as the colorant, it is possible to use a pigment dispersing agent in addition to the pigment. As a usable pigment dispersing agent, a polymer dispersing agent, an anionic surfactant, a cationic surfactant, an amphoteric surfactant, a nonionic surfactant, and the like are exemplified.

As the polymer dispersing agent, a polymer having a hydrophilic structure part and a hydrophobic structure part may be used. As the polymer having a hydrophilic structure part and a hydrophobic structure part, a condensation polymer and an addition polymer can be used. As the condensation polymer, known polyester dispersing agents can be exemplified. As the addition polymer, addition polymers of monomers having an $\alpha,\beta$-ethylenically unsaturated group can be exemplified. By copolymerizing a monomer having an $\alpha,\beta$-ethylenically unsaturated group and a hydrophobic group and a monomer having an $\alpha,\beta$-ethylenically unsaturated group and a hydrophobic group in combination, a targeted polymer dispersing agent can be obtained. Moreover, a homopolymer of monomers having an $\alpha,\beta$-ethylenically unsaturated group and a hydrophilic group can be used as well.

As the monomer having an $\alpha,\beta$-ethylenically unsaturated group and a hydrophilic group, monomers having a carboxyl group, a sulfonic acid group, a hydroxyl group, a phosphoric acid group, or the like, such as acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylic amide, methacryloxy ethyl phosphate, bismethacryloxy ethyl phosphate, methacryloxy ethyl phenyl acid phosphate, ethylene glycol dimethacrylate, and diethylene glycol dimethacrylate can be exemplified.

As the monomer having an $\alpha,\beta$-ethylenically unsaturated group and a hydrophobic group, styrene derivatives such as styrene, $\alpha$-methylstyrene and vinyl toluene, vinyl cyclohexane, vinyl naphthalene, vinyl naphthalene derivatives, alkyl acrylate, alkyl methacrylate, phenyl methacrylate, cycloalkyl methacrylate, alkyl crotonate, dialkyl itaconate, dialkyl maleate and the like are exemplified.

Specific examples of the polymer which is used as a polymer dispersant include styrene-styrene sulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer. In addition to them, a monomer having a polyoxyethylene group or a hydroxyl group may be copolymerized.

Examples of the above-described polymer dispersant include ones having a weight average molecular weight of 2000 to 50000.

These pigment dispersing agents may either be used alone or two or more kinds in combination. Although the addition amount of the pigment dispersing agent varies according to the types of the pigments, in general, it is added at a ratio of 0.1 to 100% by weight in total with respect to the pigment.

The pigment coated with a resin may be used as the colorant. Such pigment is called as microcapsule pigments, which include commercially available microcapsule pigments manufactured by Dainippon Ink & Chemicals, Inc. and Toyo Ink MFG Co., Ltd. as well as microcapsule pigments prepared for use in the present invention.

Moreover, a resin dispersing pigment in which a polymer substance is physically absorbed or chemically bonded with the above-mentioned pigment can also be used.

In addition, examples of the recording material include dyes such as a hydrophilic anionic dye, a direct dye, a cationic dye, a reactive dye, polymer dyes, and oil-soluble dyes; wax powders, resin powders, and emulsions colored with dyes; a fluorescent dye and a fluorescent pigment; an infrared absorber; an ultraviolet absorber; magnetic bodies such as ferromagnetic bodies represented by ferrite and magnetite; semiconductors and photocatalysts represented by titanium oxide and zinc oxide; other organic and inorganic electronic material particles.

The content (concentration) of the recording material is, for example, in the range of 5 to 30% by weight with respect to the ink.

The volume average particle diameter of the recording material is for example in the range of 10 nm to 1000 nm.

The volume average particle diameter of the recording material denotes the particle diameter of the recording material itself, or the particle diameter of the recording material with an additive when the additive such as a dispersing agent is adhered onto the recording material. In the invention, as the device for measuring the volume average particle diameter, MICROTRUCK UPA particle diameter analyzer 9340 (produced by Leeds & Northrup Corp.) is used. The measurement is performed with 4 ml of an ink placed in a measurement cell according to a predetermined measuring method. As the parameters to be inputted at the time of the measurement, the viscosity of the ink is inputted as the viscosity, and the density of the recording material is inputted as the density of the dispersion particles Next, other additives will be explained. A surfactant may be added to the ink.

As the kinds of the surfactants, various kinds of anionic surfactants, nonionic surfactants, cationic surfactants, and amphoteric surfactants, or the like are exemplified. In particular, anionic surfactants or nonionic surfactants may be used.

Hereinafter, specific examples of the surfactant are mentioned. Examples of the anionic surfactant may include alkylbenzenesulfonic acid salt, alkylphenylsulfonic acid salt, alkylnaphthalenesulfonic acid salt, higher fatty acid salt, sulfuric acid ester salt of higher fatty acid ester, sulfonic acid salt of higher fatty acid ester, sulfuric acid ester salt and sulfonic acid salt of higher alcohol ether, higher alkylsulfosuccinic acid salt, polyoxyethylenealkyl ethercarboxylic acid salt, polyoxyethylenealkyl ethersulfuric acid salt, alkylphosphoric acid salt and polyoxyethylenealkyl etherphosphoric acid salt, and more particularly dodecylbenzenesulfonic acid salt, isopropylnaphthalenesulfonic acid salt, monobutylphenylphenol monosulfonic acid salt, monobutylbiphenylsulfonic acid salt, monobutylbiphenylsulfonic acid salt and dibutylphenylphenoldisulfonic acid salt.

Examples of the nonionic surfactant may include polyoxyethylene alkyl ether, polyoxyethylene alkylphenyl ether, polyoxyethylene fatty acid ester, sorbitan fatty acid ester, polyoxyethylene sorbitan fatty acid ester, polyoxyethylene sorbitol fatty acid ester, glycerine fatty acid ester, polyoxyethyleneglycerine fatty acid ester, polyglycerine fatty acid ester, sucrose fatty acid ester, polyoxyethylenealkylamine, polyoxyethylene fatty acid amide, alkylalkanol amide, polyethyleneglycolpolypropyleneglycol block copolymer, acethylene glycol and polyoxyethylene adduct of acetylene glycol, and more particularly polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide, polyethyleneglycol polypropyleneglycol block copolymer, acetylene glycol and polyoxyethylene adduct of acetylene glycol.

In addition, silicone surfactants such as polysiloxaneoxyethylene adduct, fluorine surfactants such as perfluoroalkyl carboxylic acid salt, perfluoroalkyl sulfonic acid salt and oxyethylene perfluoroalkyl ether, biosurfactants such as spiculisporic acid, rhamnolipid and lysolecithin.

These surfactants may be used solely or as a mixture. The hydrophile-lipophile balance (HLB) of the surfactant may be in the range of 1 to 20 in view of solubility, or the like.

The amount of the surfactant to be added may be 0.001% by weight to 5% by weight, or 0.01% by weight to 3% by weight.

Furthermore, additionally, various additives can be added to the ink, such as a permeating agent in order to adjust the permeation property, or polyethylene imine, polyamines, a polyvinyl pyrrolidone, a polyethylene glycol, an ethyl cellulose, and a carboxy methyl cellulose, in order to control the ink ejection property, and compounds of alkali metals such as a potassium hydroxide, a sodium hydroxide and a lithium hydroxide for adjusting the conductivity and the pH. As needed, a pH buffer, an antioxidant, a mildew preventing agent, a viscosity adjusting agent, a conductive agent, an ultraviolet ray absorbing agent, a chelating agent, or the like can be added as well.

Next, characteristics of the ink will be mentioned. First, the surface tension of the ink may be in the range of from 20 mN/m to 45 mN/m.

Here, as the surface tension, the value measured under the conditions of 23° C., and 55% RH by the use of the WILL-HERMY type surface tension meter (produced by Kyowa Kaimen Kagaku Corp.) is used.

The viscosity of the ink may be in the range of 1.5 to 30 mPa·s, or in the range of 1.5 to 20 mPa·s. In view of the head ejection property, the ink viscosity may be 20 mPa·s or less. The viscosity of the ink may be lower than the viscosity of the above-described curable solution.

Here, as the viscosity, the value measured at a temperature of 23° C. and at a shearing speed of 1,400 $s^{-1}$, using REOMAT 115 (produced by Contraves) as the measurement device is used.

The ink is not limited to the above-described configuration. Besides the recording materials, it may include for example functional materials such as a liquid crystal material and an electronic material.

In the embodiments above, the ink droplets 14A are ejected selectively based on the image data from the inkjet recording head 14 of each color of black, yellow, magenta, and cyan, and full-colored images are recorded on the recording medium P. However, it is not limited to the recording of the letters and the images on the recording medium. The apparatus in the invention may be applied generally to the liquid droplet ejection (spray) apparatus used in industry.

EXAMPLES

The invention is specifically explained in detail by referring to the examples below. However, these examples do not limit the invention.

Example 1

Using a recording apparatus with the same configuration as the above-described second embodiment (refer to FIG. 2), a layer to be cured is formed by supplying a curable solution to the intermediate transfer belt by the solution supply device, and an image is formed by ejecting each ink from the recording head onto the layer to be cured. After the layer to be cured is transferred to the recording medium by the transfer device, the layer to be cured is cured by supplying a stimulus by the stimulus supply device, thereby carrying out printing, and the evaluation is performed. The condition is as follows.

Intermediate transfer belt: a polyimide endless belt which has a thickness of 0.1 mm, a belt width of 350 mm, and an outer diameter of 168 mm, and is coated with a fluorine resin (process speed: 400 mm/s)

Solution supply device: a gravure roll coater (layer thickness of the layer to be cured: 15 μm)

Each recording head: a recording head of a piezo method (resolution 600 dpi (dpi: number of dots per inch, below the same))

Transfer device (pressure roll): a steel pipe having a diameter of 30 mm on which a fluorine resin is coated (pressing force against the intermediate transfer belt: line pressure 3 kgf/cm)

Stimulus supply device: a metal halide lamp (lamp maximum output: 1.5 KW)

Recording medium: two kinds (art paper (OK Kinfuji) and plain paper (FX-P paper, manufactured by Fuji Xerox Co., Ltd.))

The curable solution and the ink of each color manufactured as follows are used.

—Curable Solution 1—

Polyurethane acrylate (curable material): 25 parts by weight

Acryloyl morpholine (curable material): 40 parts by weight 2-methyl-1-(4-methylthiophenyl)-2-morpholinopropane-1-one (photopolymerization initiator): 2 parts by weight polynorbornene (oil absorbing material): 30 parts by weight As a surfactant, 0.3 parts by weight of sorbitan trioleate is added to the above composition, and mixed using a roll mill to obtain a "curable solution 1" having a viscosity of about 1500 mPa·s. The liquid absorbing amount of the oil absorbing material in the "curable solution 1" is shown in Table 1.

—Black Ink 1—

Bk pigment dispersion liquid (Solsperse 2800 (manufactured by Noveon, Inc.: a dispersing agent) is added to carbon black and dispersed in Isopar L (manufactured by Exxon Mobil Corporation)) (pigment concentration: 20% by weight): 20 parts by weight Isopar E (manufactured by Exxon Mobil Corporation) (non-polar solvent): 60 parts by weight butyl oleate: 10 parts by weight The above composition is mixed, and Isopar E and butyl oleate are further added thereto to adjust the viscosity so as to be 7.8 mPa·s, thereby obtaining a "black ink 1".

—Cyan Ink 1—

Cyan pigment dispersion liquid (Solsperse 55000 (manufactured by Noveon, Inc.: a dispersing agent) is added to a phthalocyanine pigment and is dispersed in Isopar G (manufactured by Exxon Mobil Corporation)) (pigment concentration: 15% by weight): 30 parts by weight Isopar L (manufactured by Exxon Mobil Corporation): 55 parts by weight Ethylated soy oil: 10 parts by weight The above composition is mixed, and Isopar L and ethylated soy oil are further added thereto to adjust the viscosity so as to be 6.7 mPa·s, thereby obtaining a "cyan ink 1".

—Magenta Ink 1—

Magenta pigment dispersion liquid (Solsperse 37500 (manufactured by Noveon, Inc.: a dispersing agent) is added to a quinacridone pigment and is dispersed in Isopar M (manufactured by Exxon Mobil Corporation)) (pigment concentration: 18% by weight): 25 parts by weight Isopar G (manufactured by Exxon Mobil Corporation) (non-polar solvent): 45 parts by weight Ethyl oleate: 20 parts by weight Oleyl alcohol: 5 parts by weight The above composition is mixed, and Isopar G and ethyl oleate are further added thereto to adjust the viscosity so as to be 5.6 mPa·s, thereby obtaining a "magenta ink 1".

—Yellow Ink 1—

Yellow pigment dispersion liquid (Disperbyk-101 (manufactured by BYK-Chemie: a dispersing agent) is added to Pigment Yellow 74 and is dispersed in Isopar E (manufactured by Exxon Mobil Corporation)) (pigment concentration 12% by weight): 25 parts by weight Isopar M (manufactured by Exxon Mobil Corporation) (non-polar solvent): 55 parts by weight Methyl stearate: 15 parts by weight The above composition is mixed, and Isopar M and methyl stearate are further added thereto to adjust the viscosity so as to be 5.9 mPa·s, thereby obtaining a "yellow ink 1".

The "curable solution 1" is coated using a roll coater on the fluorine-coated resin belt to form a "layer to be cured" having a thickness of 15 μm, and printing of each of the four ink is performed using a piezo head (resolution: 600 dpi) on the "layer to be cured". After that, the resin belt and the art paper (OK Kinfuji) or plain paper (FX-P paper, manufactured by Fuji Xerox Co., Ltd.) are brought into contact with each other, and simultaneously with transferring the "layer to be cured" to the paper, curing is performed by ultraviolet ray irradiation using a metal halide lamp having an output of 1.5 kW.

Comparative Example 1

An image is formed by ejecting the same respective inks as in Example 1 directly onto art paper (OK Kinfuji) or plain paper (FX-P paper, manufactured by Fuji Xerox Co., Ltd.) from each recording head, but the transfer step and ultraviolet ray irradiation step are not performed.

Comparative Example 2

Printing is performed in the same manner as in Example 1 except that the transfer is performed onto art paper (OK Kinfuji) or plain paper (FX-P paper, manufactured by Fuji Xerox Co., Ltd.) after an image is formed by ejecting the inks directly onto the intermediate transfer drum without supplying the curable solution containing the curable material to the intermediate transfer drum and without performing the ultraviolet ray irradiation step.

Comparative Example 3

Printing is performed in the same manner as in Example 1 except that instead of the "curable solution 1", a "curable solution A" having the same composition as that of the curable solution 1 except for not including polynorbornene is used.

Example 2

—Curable Solution 2—

Polyester acrylate (curable material): 20 parts by weight

N,N-dimethylacrylamide (curable material): 40 parts by weight 2,2-dimethoxy-1,2-diphenylethane-1-one (photopolymerization initiator): 1.5 parts by weight Calcium dehydroabietate (oil absorbing material): 40 parts by weight As a surfactant, 0.4 parts by weight of Solsperse 32000 (manufactured by Lubrizol Corporation) is added to the above composition and mixed using a ball mill to obtain a "curable solution 2" having a viscosity of about 3400 mPa·s. The liquid absorbing amount of the oil absorbing material in the "curable solution 2" is shown in Table 1.

Printing is performed in the same manner as in Example 1 except that the "curable solution 2" is used instead of the "curable solution 1" and the thickness of the "layer to be cured" is 10 μm.

Example 3

—Curable Solution 3—

Epoxy acrylate (curable material): 40 parts by weight
N-hydroxyethyl acrylamide (curable material): 35 parts by weight Irgacure 754 (photopolymerization initiator): 0.5 parts by weight Styrene-butadiene copolymer (oil absorbing material): 25 parts by weight As a surfactant, 0.5 parts by weight of Solsperse 39000 (manufactured by Lubrizol Corporation) is added to the above composition and mixed using a ball mill to obtain a "curable solution 3" having a viscosity of about 4000 mPa·s. The liquid absorbing amount of the oil absorbing material in the "curable solution 3" is shown in Table 1.

Printing is performed in the same manner as in Example 1 except that the "curable solution 3" is used instead of the "curable solution 1" and the thickness of the "layer to be cured" is 8 μm.

Example 4

A "curable solution 4" is prepared in the same manner as the "curable solution 1" in Example 1 except that as the oil absorbing material, benzylidene sorbitol is used instead of polynorbornene. The same inks as those in Example 1 are used, and the same evaluations as those in Example 1 are performed.

Comparative Example 4

—Curable Solution B—

A "curable solution B" is prepared in the same manner as the "curable solution 1" in Example 1 except that sodium polyacrylate, which is a "water absorbing material", is used instead of polynorbornene.

Printing is performed in the same manner as in Example 1 except that the "curable solution B" is used instead of the "curable solution 1".

TABLE 1

| Example | Curable solution | Oil absorbing material | Curable material | Liquid absorbing amount of oil absorbing material with respect to curable material (ml/100 g) | Oily solvent | Liquid absorbing amount of oil absorbing material with respect to oily solvent (ml/100 g) |
|---|---|---|---|---|---|---|
| Example 1 | Curable solution 1 | Polynorbornene | Polyurethane acrylate | about 30 | Isopar E | about 1000 |
| | | | | | Isopar L | about 1000 |
| | | | Acryloyl morpholine | about 30 | Isopar G | about 1000 |
| | | | | | Isopar M | about 1000 |
| Example 2 | Curable solution 2 | Calcium dehydroabietate (Rosins) | Polyester acrylate | about 70 | Isopar E | about 1500 |
| | | | | | Isopar L | about 1500 |
| | | | N,N-dimethylacrylamide | about 70 | Isopar G | about 1500 |
| | | | | | Isopar M | about 1500 |
| Example 3 | Curable solution 3 | Styrene-butadiene copolymer | Epoxy acrylate | about 20 | Isopar E | about 500 |
| | | | | | Isopar L | about 500 |
| | | | N-hydroxyethyl acrylamide | about 20 | Isopar G | about 500 |
| | | | | | Isopar M | about 500 |
| Example 4 | Curable solution 4 | Benzylidene sorbitol | Polyurethane acrylate | about 40 | Isopar E | about 80 |
| | | | | | Isopar L | about 80 |
| | | | Acryloyl morpholine | about 40 | Isopar G | about 80 |
| | | | | | Isopar M | about 80 |

Evaluations of Examples 1-4 and Comparative Examples 1-4 are performed as follows.

—Evaluation on Drying Property—

The drying speed after printing is measured. Specifically, coated paper (High Grade G CAA0002, manufactured by Fuji Xerox Co., Ltd.) is placed on the printed image, and a load of 100 g/cm² is applied thereon. The time required to reach the state that the ink is not transferred to the placed paper is determined. Evaluation criteria are as follows, and G1 and G2 are practically not problematic. The results are shown in Table 2.

G1: less than 1 second after printing
G2: from 1 second to less than 2 second after printing concentration of 1.0 ppm for 24 hours. The optical density of the printed material after the exposure is measured using an X-rite 404. Evaluation criteria are as follows, and G1 and G2 are practically not problematic. The results are shown in Table 2.

G1: The ratio of the optical density after exposure to the initial optical density is 90% or more.

G2: The ratio of the optical density after exposure to the initial optical density is 80% or more.

G3: The ratio of the optical density after exposure to the initial optical density is less than 80%.

TABLE 2

| Example | Curable solution | Oil absorbing material | Recoding medium | Drying property | Bleeding | Fixability | Light resistance | Gas resistance |
|---|---|---|---|---|---|---|---|---|
| Example 1 | Curable solution 1 | Polynorbornene | Art paper | G1 | G1 | G1 | G1 | G1 |
| | | | Plain paper | G1 | G1 | G1 | G1 | G1 |
| Example 2 | Curable solution 2 | Calcium dehydroabietate (Rosins) | Art paper | G1 | G1 | G1 | G1 | G1 |
| | | | Plain paper | G1 | G1 | G1 | G1 | G1 |
| Example 3 | Curable solution 3 | Styrene-butadiene copolymer | Art paper | G1 | G1 | G1 | G1 | G1 |
| | | | Plain paper | G1 | G1 | G1 | G1 | G1 |
| Example 4 | Curable solution 4 | Benzylidene sorbitol | Art paper | G1 | G2 | G1 | G1 | G1 |
| | | | Plain paper | G1 | G2 | G1 | G1 | G1 |
| Comparative Example 1 | none | | Art paper | G4 (*1) | G3 | G3 | G2 | G3 |
| | | | Plain paper | G2 | G3 | G2 | G2 | G3 |
| Comparative Example 2 | none | | Art paper | G4 (*1) | G3 | G3 | G2 | G3 |
| | | | Plain paper | G2 | G3 | G2 | G2 | G3 |
| Comparative Example 3 | Curable solution A | none | Art paper | G1 | G3 | G1 | G1 | G1 |
| | | | Plain paper | G1 | G3 | G1 | G1 | G1 |
| Comparative Example 4 | Curable solution B | Water absorbing material is used instead of oil absorbing material. | Art paper | G1 | G3 | G1 | G1 | G1 |
| | | | Plain paper | G1 | G3 | G1 | G1 | G1 |

(*1): The ink remains on the paper, and the image is not fixed.

G3: from 2 second to less than 5 second after printing
G4: 5 second or more after printing —Evaluation on Bleeding—

Evaluation is visually performed with respect to the character portion of the obtained printed material. Evaluation criteria are as follows, and G1 and G2 are practically not problematic. The results are shown in Table 2.

G1: Bleeding of the character portion is not observed.
G2: Bleeding of the character portion is slightly observed by practically not problematic.
G3: Bleeding of the character portion is significantly observed.

—Evaluation on Fixability—

The image portion is rubbed with a finger 1 minute after printing, and the fixability is determined from the dirt of the finger. Evaluation criteria are as follows, and G1 and G2 are practically not problematic. The results are shown in Table 2.

G1: Dirt is not observed.
G2: Dirt is slightly observed.
G3: Dirt is clearly observed.

—Evaluation on Light Resistance—

Xenon lamp is irradiated for 12 hours after 24 hours of the completion of the printing, and the degree of fading is sensuously evaluated between before and after the irradiation. Evaluation criteria are as follows, and G1 and G2 are practically not problematic. The results are shown in Table 2.

G1: Fading is not observed.
G2: Fading is slightly observed.
G3: Fading is significantly observed.

—Evaluation on Gas Resistance—

A printed material on which 100% coverage pattern is printed is prepared, and exposed to the condition of an ozone The above results of the Examples and the Comparative Examples indicate that in the Examples, image formation may be performed on various recording media including permeable media and impermeable media, diffusion of ink may be prevented, and a high resolution image may be formed, compared to the Comparative Examples.

What is claimed is:

1. A composition for image recording, comprising a curable material that is curable by an external stimulus, and an oil absorbing material comprising a styrene-butadiene copolymer.

2. The composition for image recording according to claim 1, wherein the oil absorbing material has a liquid non-absorbing property with respect to the curable material.

3. The composition for image recording according to claim 1, wherein the curable material is curable by ultraviolet ray irradiation.

4. An image recording ink set, comprising the composition for image recording according to claim 1, and an oily ink comprising an oily solvent.

5. The image recording ink set according to claim 4, wherein the oil absorbing material has a liquid absorbing property with respect to the oily solvent.

6. The image recording ink set according to claim 4, wherein the oily solvent is a non-polar solvent.

7. A recording apparatus comprising:
an intermediate transfer body;
a supply unit that supplies the composition for image recording according to claim 1 onto the intermediate transfer body;
an ejection unit that ejects an oily ink comprising an oily solvent onto a layer to be cured that is formed of the composition for image recording supplied onto the intermediate transfer body;

a transfer unit that transfers the layer to be cured onto which the oily ink has been ejected to a recording medium from the intermediate transfer body; and a stimulus supply unit that supplies a stimulus for curing the layer to be cured.

8. A recording apparatus comprising:

a supply unit that supplies the composition for image recording according to claim 1 onto a recording medium;

an ejection unit that ejects an oily ink comprising an oily solvent onto a layer to be cured that is formed of the composition for image recording supplied onto the recording medium; and a stimulus supply unit that supplies a stimulus for curing the layer to be cured.

9. The recording apparatus according to claim 7, wherein the oil absorbing material included in the composition for image recording has a liquid absorbing property with respect to the oily solvent.

10. The recording apparatus according to claim 7, wherein the oily solvent is a non-polar solvent.

11. An image recording ink set, comprising a composition for image recording, and an oily ink comprising a non-polar oily solvent, wherein the composition for image recording comprises a curable material that has polarity and is curable by an external stimulus, and an oil absorbing material comprising a styrene-butadiene copolymer, the oil absorbing material having a liquid absorbing amount with respect to the non-polar oily solvent larger than a liquid absorbing amount with respect to the curable material.

12. The image recording ink set of claim 11, wherein the oil absorbing material has a liquid absorbing property with respect to the oily solvent.

13. The image recording ink set of claim 11, wherein the oily solvent is a non-polar solvent.

14. A recording apparatus comprising:

an intermediate transfer body;

the image recording ink set according to claim 11;

a supply unit that supplies the composition for image recording onto the intermediate transfer body;

an ejection unit that ejects the oily ink onto a layer to be cured that is formed of the composition for image recording supplied onto the intermediate transfer body;

a transfer unit that transfers the layer to be cured onto which the oily ink has been ejected to a recording medium from the intermediate transfer body; and a stimulus supply unit that supplies a stimulus for curing the layer to be cured.

15. A recording apparatus comprising:

the image recording ink set according to claim 11;

a supply unit that supplies the composition for image recording onto a recording medium;

an ejection unit that ejects the oily ink onto a layer to be cured that is formed of the composition for image recording supplied onto the recording medium; and a stimulus supply unit that supplies a stimulus for curing the layer to be cured.

16. The recording apparatus according to claim 14 wherein the oil absorbing material included in the composition for image recording has a liquid absorbing property with respect to the oily solvent.

17. The recording apparatus according to claim 14, wherein the oily solvent is a non-polar solvent.

* * * * *